(No Model.)

W. RENNYSON.
BICYCLE.

No. 244,931. Patented July 26, 1881.

Witnesses
James F. Tobin.
Harry Smith

Inventor
William Rennyson
by his Attorneys
Howson and Sons

UNITED STATES PATENT OFFICE.

WILLIAM RENNYSON, OF NORRISTOWN, PENNSYLVANIA.

BICYCLE.

SPECIFICATION forming part of Letters Patent No. 244,931, dated July 26, 1881.

Application filed June 23, 1881. (No model.)

*To all whom it may concern:*

Be it known that I, WILLIAM RENNYSON, a citizen of the United States, residing in Norristown, Montgomery county, Pennsylvania, have invented certain Improvements in Bicycles, of which the following is a specification.

The object of my invention is to prevent the rider of a bicycle from being thrown head first from his seat when the driving-wheel meets with an obstruction, liability to this accident, which is termed "a header," being one of the main objections to the bicycle as now constructed.

Figure 1:
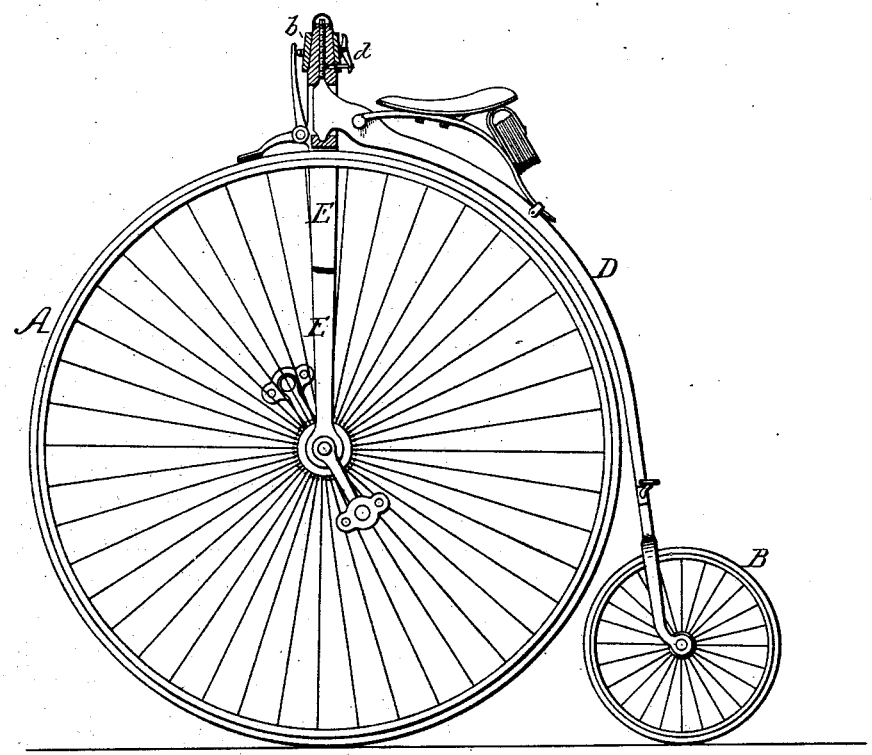
Figure 2:
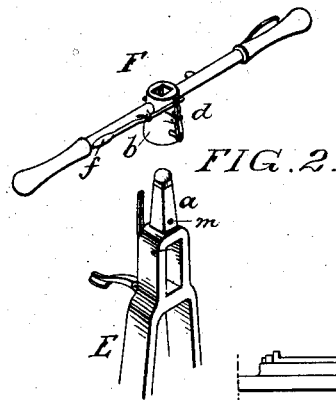
Figure 3:
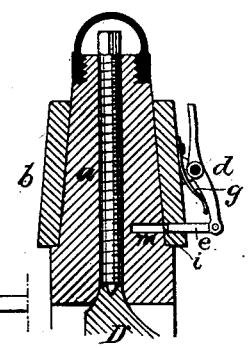

In the accompanying drawings, Figure 1 is a side view, partly in section, of a bicycle constructed in accordance with my invention; Fig. 2, a perspective view of part of the same; Fig. 3, a section of part of the bicycle on a larger scale than Fig. 1, and Fig. 4 a view of a modified method of carrying out my invention.

A is the main or driving wheel of a bicycle; B, the small hind wheel; D, the curved reach or backbone; and E, the steering-yoke, carrying the axle of the front wheel, and pivoted to the front end of the reach D in the usual manner.

F is the steering bar or handle, which, in an ordinary bicycle, is secured to or forms part of the upper end of the steering-yoke, and it is this handle-bar which is mainly responsible for the accidents known as "headers," for the reason that when the wheel A meets with an obstruction and the perch tips up and the rider is thrown forward from his seat the thighs or knees are brought into violent contact with the laterally-projecting handle-bar, and the rider is thrown head foremost onto the earth in advance of the machine. In order to overcome this difficulty, I discard the usual practice of securing the handle-bar rigidly to or making it integral with the upper end of the steering-yoke, and construct said handle-bar and combine it with the yoke in such a manner that it can yield when pressure is exerted upon it. Thus, in Figs. 1, 2, and 3, the yoke E has a stem, *a*, of square or other angular cross-section, and preferably tapered, this stem being adapted to an opening of corresponding shape in a central hub or enlargement, *b*, of the handle-bar, as shown in the drawings. While this permits the efficient control of the steering-yoke by the handle-bar when riding, the first impulse of the rider on being thrown from his seat is to lift said handle-bar from the stem of the steering-yoke, so that it presents no impediment to his forward movement, the rider being free to leap in advance of the machine, so as to alight on his feet; or, even if the handle-bar is released when the machine tips up, the said bar, when struck by any part of the rider's person, will be at once detached from the steering-yoke, and will not offer sufficient resistance to his movement to cause him to be thrown forward on his face or head. It occasionally happens, however, in riding bicycles that it is desirable to exert an upward pull or lift on the steering-yoke; hence the importance of some provision for locking the handle-bar to the upper end of the steering-yoke under such circumstances. This object I attain by providing the hub *b* of the handle-bar F with a lever, *d*, one arm of which carries a pin, *e*, the other arm being acted upon by one arm of the lever *f*, hung to the horizontal portion of said bar F, so that it can be readily operated by one hand, a spring, *g*, acting on the lever *d* in such a manner as to move the pin *e* away from the hub *b*. When the outer arm of the lever *f* is depressed, however, the upper arm of the lever *d* is thrown outward, and this causes an inward movement of the lower arm of the same, the pin *e* being thrust through an opening, *i*, in the hub of the bar F, and being caused to enter an opening, *m*, in the stem *a* of the steering-yoke, so that as long as pressure is exerted upon the outer arm of the lever *f* the handle-bar is firmly locked to the yoke E, the instant release of said bar from the yoke being effected, however, by the action of the spring *g* as soon as pressure is removed from the lever *f*. This duplex-lever arrangement is not necessary for the carrying out of this feature of my invention, as the lever *d* alone may be used, or a spring-bolt may take the place of the lever, suitable means being provided for retaining the said bolt in its retracted position. It is preferable, however, to use a lever upon which pressure must be exerted constantly as long as the handle-bar is locked to the yoke, for by this means the locking of the two must necessarily be done designedly, and accidental locking is prevented.

Figure 4:
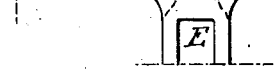

The detachability of the handle-bar from the steering-yoke is not absolutely necessary in carrying out my invention. For instance, the opposite projecting arms of said bar may be pivoted to the upper end of the yoke, as shown in Fig. 4, so that they are free to be thrown up in the direction of the arrows, but cannot be depressed below a horizontal line, a sliding bolt, such as shown, or a turn-buckle, or other means of locking the arms to the upper end of the yoke, being provided, in order that the yoke may be subjected to a lifting action when desired.

I claim as my invention—

1. A bicycle the steering-yoke of which is furnished with a steering bar or handle connected to the yoke, as described, whereby it is capable of yielding in the direction of the length of the yoke when subjected to pressure, as set forth.

2. A bicycle in which the steering-yoke is combined with a steering bar or handle, which simply rests upon and is not secured to the yoke, whereby it is capable of being instantly detached therefrom, as set forth.

3. The combination of the steering-yoke of the bicycle with the yielding or detached steering bar or handle, and with means, substantially as described, whereby said bar may be locked to or released from the yoke, as set forth.

In testimony whereof I have signed my name to this specification in the presence of two subscribing witnesses.

WILLIAM RENNYSON.

Witnesses:
JAMES F. TOBIN,
HARRY SMITH.